(12) United States Patent
Takahashi (10) Patent No.: US 6,173,615 B1
(45) Date of Patent: Jan. 16, 2001

(54) SENSING DEVICE FOR MEASURING A LOAD ON A VEHICLE IN TWO DIRECTIONS SIMULTANEOUSLY

(75) Inventor: Naoya Takahashi, Shimada (JP)

(73) Assignee: Yazaki Corporation, Tokyo (JP)

( * ) Notice: Under 35 U.S.C. 154(b), the term of this patent shall be extended for 0 days.

(21) Appl. No.: 09/202,418

(22) PCT Filed: Jun. 4, 1997

(86) PCT No.: PCT/JP97/01898

§ 371 Date: Dec. 14, 1998

§ 102(e) Date: Dec. 14, 1998

(87) PCT Pub. No.: WO97/49975

PCT Pub. Date: Dec. 31, 1997

(30) Foreign Application Priority Data

Jun. 26, 1996 (JP) .................................................. 8-165970

(51) Int. Cl.[7] .................................................. G01N 3/00
(52) U.S. Cl. .................................................. 73/794; 73/767
(58) Field of Search ........................... 73/763, 767, 768, 73/774, 794, 795, 818, 826, 849, 862.042

(56) References Cited

U.S. PATENT DOCUMENTS

| 4,042,049 |   | 8/1977  | Reichow et al. ............... 177/137   |
| 4,118,933 | * | 10/1978 | Coleman et al. ............... 73/766    |
| 4,299,130 | * | 11/1981 | Koneval ......................... 73/766 |
| 4,462,018 | * | 7/1984  | Yang et al. ..................... 338/3  |
| 4,522,072 | * | 6/1985  | Sulouff et al. ................ 73/765   |
| 4,576,053 |   | 3/1986  | Hatamura ...................... 73/862.66|
| 4,747,456 | * | 5/1988  | Kitagawa et al. ............. 177/211    |
| 5,263,375 | * | 11/1993 | Okada .......................... 73/862.042|
| 5,327,791 |   | 7/1994  | Walker ......................... 73/862.628|
| 5,435,194 |   | 7/1995  | Schedrat et al. ............ 73/862.57   |

FOREIGN PATENT DOCUMENTS

| 34 10 845 | 9/1985  | (DE) | .............................. G01G/11/04 |
| 60-122322 | 6/1985  | (JP) | .............................. G01G/3/14  |
| 6-221903  | 8/1994  | (JP) | .............................. G01G/19/12 |
| 6-313740  | 11/1994 | (JP) | .............................. G01L/1/22  |

* cited by examiner

*Primary Examiner*—Max Noori
(74) *Attorney, Agent, or Firm*—Sughrue, Mion, Zinn, Macpeak & Seas, PLLC (57) ABSTRACT

To detect changes of a load on a vehicle in two directions simultaneously by itself. A width-direction load sensor (3) and a thickness-direction load sensor (4) are mounted on a sensor portion (2b) of a sensing device (1) interconnecting fixing portions (2c) and (2c) defined respectively by opposite end portions of a plate-like member (2) spaced from each other in a longitudinal direction (X) of the plate-like member (2) having an insulating film coated on a surface thereof, the two load sensors being spaced from each other in the longitudinal direction (X) of the plate-like member (2). The width-direction load sensor (3) is constituted by a resistance portion (3a), including four resistors (3b) to (3c) which intersect the longitudinal direction (X) and a widthwise direction (Y) of the plate-like member (2) at an angle of 45°, and are connected together to assume a substantially square shape, and four terminal portions (3f) to (3j) disposed respectively at connecting regions each interconnecting the associated ones of the resistors (3b) to (3e). The thickness-direction load sensor (4) is constituted by a resistance portion (4a), including resistors (4b) and (4d) (opposed to each other in the longitudinal direction (X) of the plate-like member (2)) and resistors (4c) and (4e) (opposed to each other in the widthwise direction (Y) of the plate-like member (2)) which are connected together to assume a substantially square shape, and four terminal portions (4f) to (4j) each interconnecting the associated ones of the resistors (4b) to (4e).

4 Claims, 9 Drawing Sheets

SENSING DEVICE FOR MEASURING A LOAD ON A VEHICLE IN TWO DIRECTIONS SIMULTANEOUSLY

TECHNICAL FIELD

This invention relates to a sensing device particularly of the strain gauge type suitably used for measuring a loaded weight of a truck or the like.

BACKGROUND ART

Recently, vehicles, such as a truck, running while loaded with heavy goods, have been regarded as having problems that the vehicle brings about a traffic accident, such as lateral turning, and that the vehicle and the road surface are subjected to extremely-premature deterioration.

One cause of these problems is overloadage, and in order to prevent this overloadage; the load, carried by the vehicle, that is, the load acting on the vehicle, has heretofore been measured.

The load, carried by the vehicle, has heretofore been measured while placing the vehicle to be measured on a platform scale called a truck weight scale. However, this facility is large, and requires a large installation space, and therefore the number of the platform scales, that can be installed, is limited, and many vehicles can not be measured, and besides the installation cost is high.

Therefore, recently, there has been provided a load measuring apparatus which is mounted on the vehicle so as to measure the load.

Figure 12:
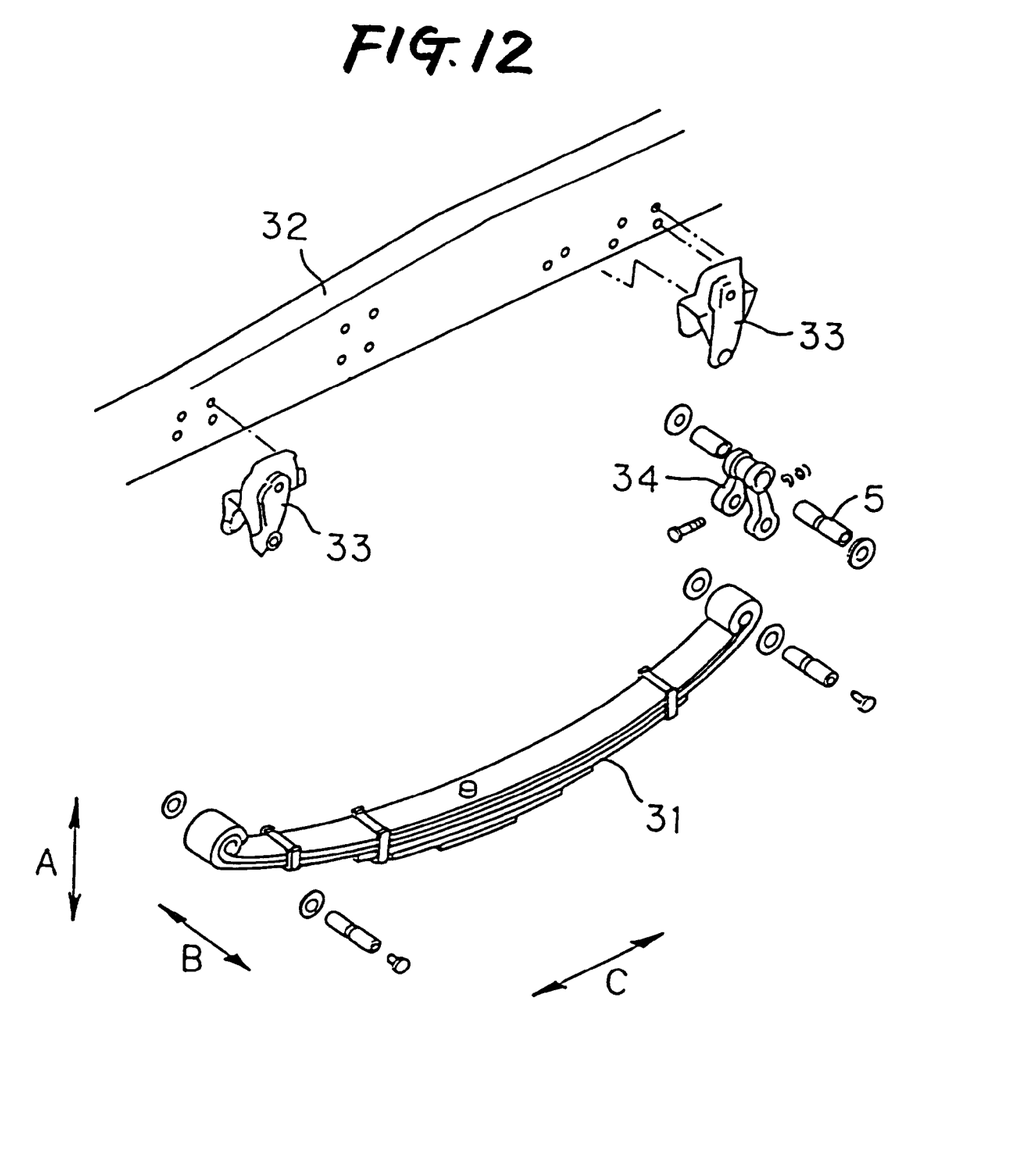
FIG. 12 is an exploded, perspective view showing a vehicle portion of a large-size vehicle, such as a truck, at which a load-measuring sensing device, to which the present invention is applied, is mounted.

For example, in Japanese Patent Application No. Hei. 7-124860 proposed by the present applicant, attention is directed to the fact that a shackle 34 is provided between one end of a leaf spring 31 (the other end of which is connected to a bed frame 32 through a bifurcated bracket 33) and another bracket 33 connected to the bed frame 32, as shown in FIG. 12 which is a perspective view, and a load-measuring sensing device of the strain gauge type, such as a strain gauge type sensor, is mounted in a shackle pin 5 which rotatably connects the shackle 34 to the bracket 33, and the load is calculated based on the sum of values measured by the plurality of sensing devices corresponding to wheels.

Figure 13:
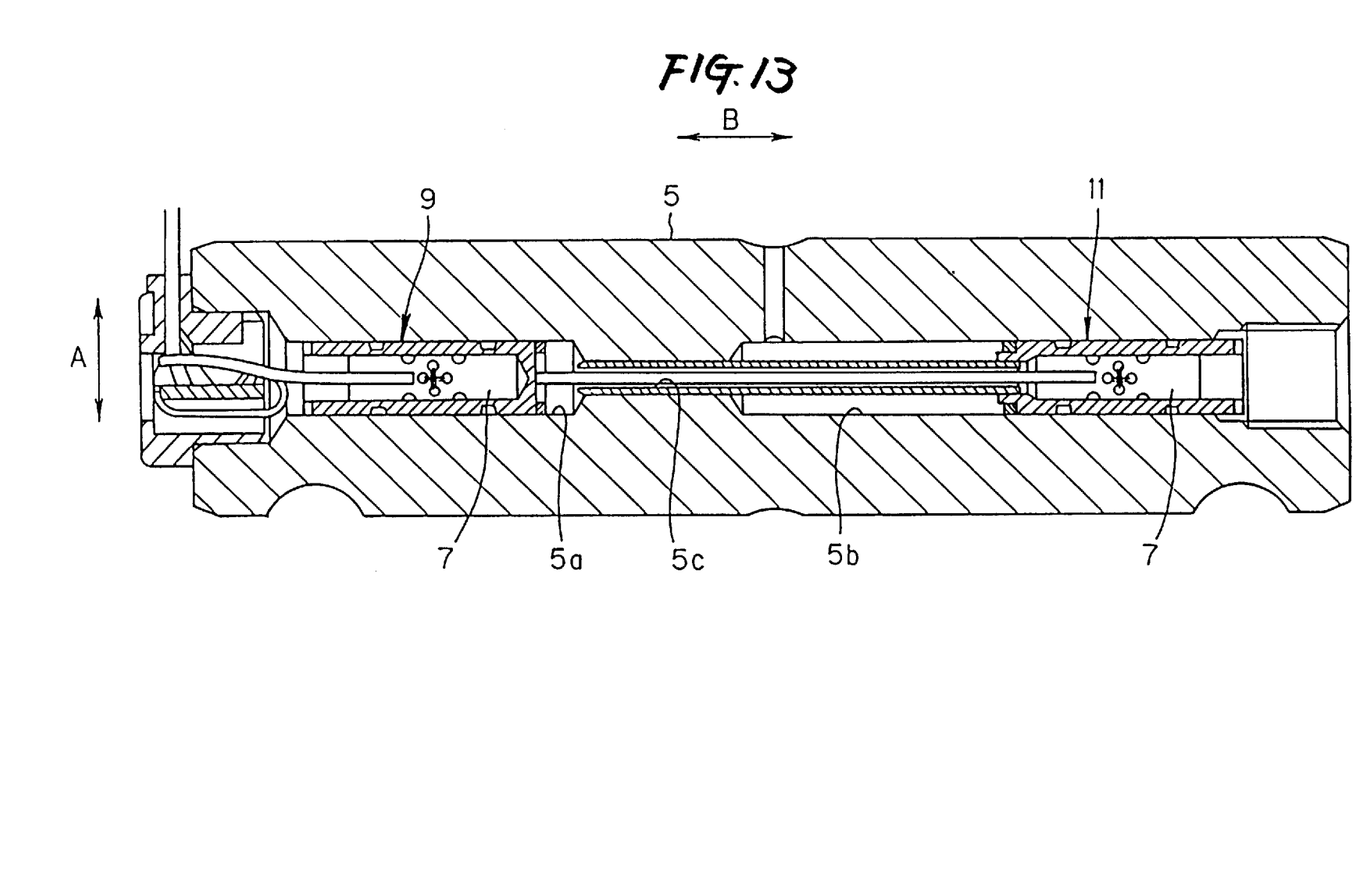
FIG. 13 is a cross-sectional view showing the arrangement of the sensing device in a shackle pin shown in FIG. 12.

FIG. 13 is a cross-sectional view showing the arrangement of the sensing device within the shackle pin, and receiving portions 5a and 5b are formed respectively in axial end portions of the shackle pin 5, and the two receiving portions 5a and 5b communicate with each other through a communication hole 5c within the shackle pin 5.

Within one receiving portion 5a of the shackle pin 5, the sensing device 7 is received in a first case assembly 9, and within the other receiving portion 5b of the shackle pin 5, the sensing device 7 is received in a second case assembly 11.

Figure 14:
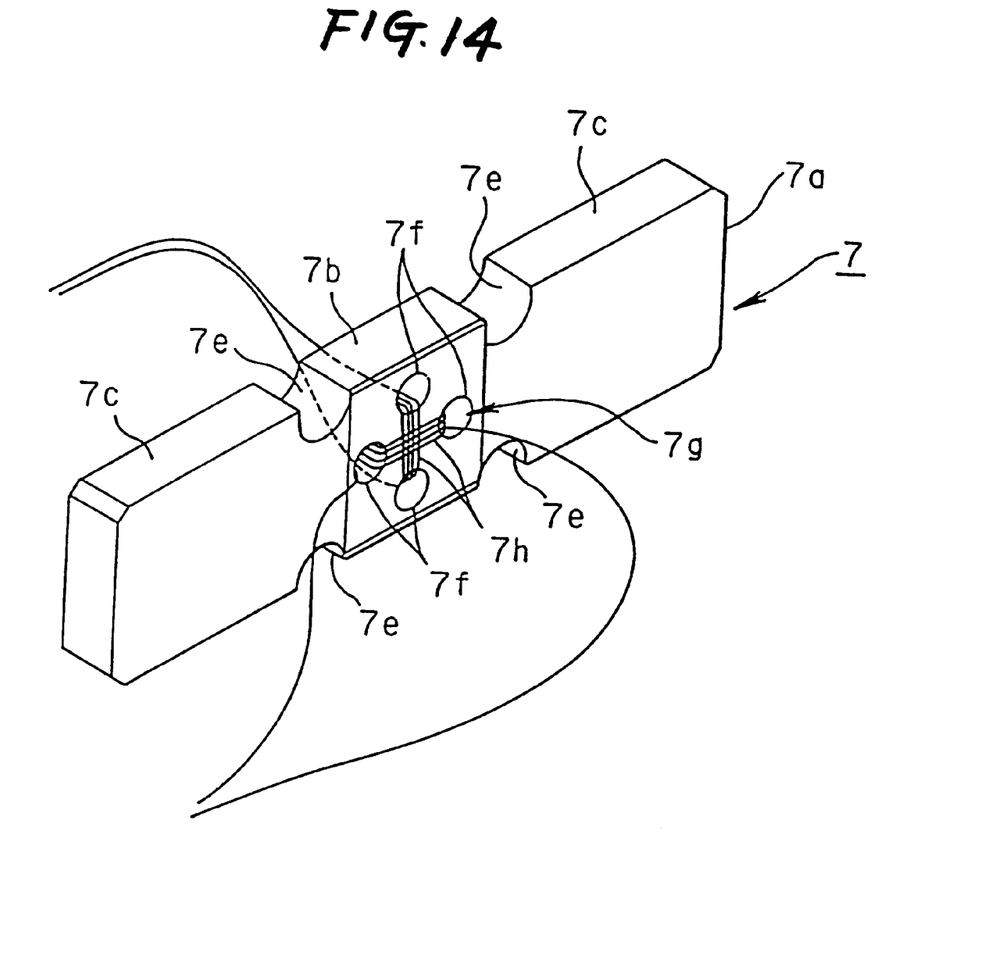
FIG. 14 is a perspective view of the conventional sensing device of FIG. 13.

As shown in FIG. 14 which is a perspective view, each of the conventional sensing devices 7, received respectively in the two receiving portions 5a and 5b of the shackle pin 5, includes a plate-like member 7a, and a coil 7g serving as a sensing portion.

The plate-like member 7a is made of a magnetic material such as permalloy, and has a substantially rectangular, flattened shape as seen in a plan view, and includes a coil portion 7b disposed at a substantially longitudinally-central portion thereof, and fixing portions 7c and 7c defined respectively by opposite end portions thereof. Notches 7e of a substantially semi-circular shape for alleviating stresses acting on the plate-like member 7a are formed respectively in four portions of opposite edges of the plate-like member 7a spaced from each other in a widthwise direction perpendicular to the above longitudinal direction, and these four portions are disposed respectively at the boundaries between the coil portion 7b and the two fixing portions 7c and 7c. Four through-holes 7f are formed through the coil portion 7b delimited by the four notches 7e, and are spaced from one another in the longitudinal and widthwise directions.

The coil 7g includes two magnet wires 7h constituting a cross coil, and these magnet wires 7h are coated with an insulating material (not shown) such as enamel.

One of the two magnet wires 7h is wound through the two through-holes 7f and 7f opposed to each other in the longitudinal direction, and its opposite end portions are extended outwardly from the two through-holes 7f and 7f, respectively. The other magnet wire 7h is wound through the two through-holes 7f and 7f opposed to each other in the widthwise direction, and its opposite end portions are extended outwardly from the two through-holes 7f and 7f, respectively.

The sensing devices 7 of this construction are received respectively in the first case assembly 9 and the second case assembly 11, and in this condition these sensing devices are received respectively in the two receiving portions 5a and 5b of the shackle pin 5 normally in such a posture (as shown in FIG. 13) that the longitudinal direction of the plate-like member 7a is disposed in the direction of the axis of the shackle pin 5 extending in a direction B of a width of a vehicle while the widthwise direction of the plate-like member 7a is disposed in a direction A of a height of the vehicle, and one fixing portion 7c is associated with the bracket 33 while the other fixing portion 7c is associated with the shackle 34.

In this condition, the axis of winding of the magnet wire 7h, wound through the two through-holes 7f and 7f opposed to each other in the longitudinal direction of the plate-like member 7a, and the axis of winding of the magnet wire 7h, wound through the two through-holes 7f and 7f opposed to each other in the widthwise direction of the plate-like member 7a, are both disposed in a plane including the longitudinal direction and widthwise direction of the plate-like member 7a, that is, in a plane including the direction A of the height of the vehicle and the direction B of the width of the vehicle.

In the sensing device 7, when electric current is caused to flow either between the opposite ends of one magnet wire 7h, wound through the two through-holes 7f and 7f opposed to each other in the longitudinal direction of the plate-like member 7a, or between the opposite ends of the magnet wire 7h, wound through the two through-holes 7f and 7f opposed to each other in the widthwise direction of the plate-like member 7a, a magnetic field is produced in the plate-like member 7a, so that induced current flows between the opposite ends of the other magnet wire 7h.

In this condition, the load is applied to the plate-like member 7a from the bed frame 32 through the bracket 33, the shackle 34 and the opposite ends of the shackle pin 5, and the bracket 33 is moved relative to the shackle 34 in the direction A of the height of the vehicle, so that the plate-like member 7a is strained in the direction A of the height of the vehicle, and at this time the direction of the magnetic field in the plate-like member 7a is changed, so that the induced current, flowing between the opposite ends of the other magnet wire 7h, is changed.

Therefore, the current, having a magnitude corresponding to the load acting on the plate-like member 7a, is obtained as an output signal from the opposite ends of the other magnet wire 7h.

Incidentally, the above-mentioned problems that the vehicle brings about a traffic accident, such as lateral turning, and that the vehicle and the road surface are subjected to extremely-premature deterioration are not always caused by the overloadage of the vehicle, and these problems can occur also when the acceleration and deceleration are effected abruptly with a considerable loaded weight.

Therefore, in a vehicle such as a truck, it is desirable to measure a change of the load in a forward-backward direction C (see FIG. 12) of the vehicle so that the acceleration/deceleration can be grasped together with the load.

However, the above conventional sensing device 7 is originally provided for the purpose of detecting only the load, that is, the loaded weight, acting in the direction A of the height of the vehicle, and therefore when the sensing device is mounted in the shackle pin 5, the axes of winding of the two magnet wires 7h and 7h, constituting the coil 7g, extend in the direction A of the height of the vehicle and the direction B of the width of the vehicle (which is the direction of the axis of the shackle pin 5), respectively, and therefore only changes of the load in the direction A of the height and the direction B of the vehicle width can be measured, and in order to measure a change of the load in the forward-backward direction of the vehicle, other sensor than the sensing devices 7 must be provided.

Thus, the conventional sensing device 7 of the strain gauge type has a disadvantage that it can not simultaneously detect changes of a load, acting on a vehicle, in two different directions.

This invention has been made under the above circumstances, and an object of the invention is to provide a sensing device of the strain gauge type which is capable of detecting changes of a load on a vehicle in two directions simultaneously by itself.

DISCLOSURE OF THE INVENTION

In order to achieve the above object, a sensing device of the present invention, defined in claim 1, is a sensing device for being strained by a load from the exterior and for outputting a signal corresponding to a level of this strain, CHARACTERIZED by the provision of a base member including first and second portions, and a third portion interconnecting the first and second portions, the third portion being strained upon movement of the second portion relative to the first portion, so that a shearing force, acting in a direction of the relative movement, is produced at the third portion; an insulating region formed on at least part of a surface of the third portion; and first and second sensors formed respectively on the insulating region; wherein each of the first and second sensors includes four resistors of an electrically-conductive material connected together to form a bridge, and when a voltage is applied between two of four connecting regions, each interconnecting the associated resistors, which are disposed on one diagonal line, a potential difference, developing between the other two connecting regions disposed on the other diagonal line, varies in accordance with the shearing force produced at the third portion; wherein the first sensor is arranged on the insulating region in such a manner that a line, connecting the two connecting regions on the one diagonal line together, extends in an interconnecting direction of interconnection of the first and second portions by the third portion; and wherein the second sensor is arranged on the insulating region in such a manner that two of the four resistors are opposed to each other, and are spaced from each other in the interconnecting direction while the other two resistors are opposed to each other, and are spaced from each other in an intersecting direction perpendicular to the interconnecting direction.

In the sensing device of the present invention defined in claim 2, the base member is mounted between first and second structural portions which are moved relative to each other in a direction of a height of a vehicle by a load acting on the vehicle, and are movable relative to each other in a vehicle-perpendicular direction perpendicular to the direction of the height of the vehicle, and one of the first and second portions is structurally connected to one of the first and second structural portions while the other of the first and second portions is structurally connected to the other of the first and second structural portions, and the intersecting direction is disposed in the direction of the height of the vehicle.

In the sensing device of the present invention defined in claim 3, the interconnecting direction is disposed in a direction of a width of the vehicle.

In the sensing device of the present invention defined in claim 4, a dimension of the third portion in at least one of the intersecting direction and a second intersecting direction perpendicular to both of the interconnecting direction and the intersecting direction is smaller than that of each of the first and second portions.

In the sensing device of the present invention defined in claim 1, when the first portion of the base member is moved relative to the second portion, so that the third portion is strained, a shearing force, acting in a direction of this relative movement, is produced at the third portion. In this case, if the direction of movement of the first portion relative to the second portion is in the intersecting direction, the opposed two resistors out of the four resistors of the first sensor are extended, and if the direction of movement of the first portion relative to the second portion is perpendicular to both of the intersecting direction and the interconnecting direction, the two resistors (opposed to each other in the interconnecting direction) out of the four resistors of the second sensor are extended. In either case, the output of only one of the first and second sensors is varied.

Therefore, when the change of the load occurs in the intersecting direction with respect to the base member and when the change of the load occurs in the direction perpendicular to both of the intersecting direction and the interconnecting direction, these changes of the load in the two directions can be detected simultaneously with the single device.

In the sensing device of the present invention defined in claim 2, when one of the first and second structural portions of the vehicle is moved relative to the other in the direction of the height of the vehicle, the first portion of the base member is moved relative to the second portion in one of the two directions, that is, the intersecting direction, disposed perpendicular to the interconnecting direction, and the direction perpendicular to both of the interconnecting direction and the intersecting direction. Therefore, with respect to the load acting on the vehicle, a change of the load in the direction of the height of the vehicle can be detected by a change of the output of one of the first and second sensors.

Apart from this, when one of the first and second structural portions is moved relative to the other in the vehicle-perpendicular direction because of the load, acting on the vehicle, or a change of the running condition of the vehicle, the first portion of the base member is moved relative to the second portion in the other of the two directions, that is, the intersecting direction and the direction perpendicular to both of the interconnecting direction and the intersecting direction. Therefore, with respect to the load acting on the vehicle, a change of the load in the forward-backward direction, disposed perpendicular to the direction of the height of the vehicle, or the direction of the width of the vehicle, can be simultaneously detected by a change of the output of the other of the first and second sensors.

In the sensing device of the present invention defined in claim 3, the interconnecting direction is disposed in the direction of the width of the vehicle, and in this case, one of the intersecting direction and the direction perpendicular to both of the interconnecting direction and the intersecting direction is disposed in the direction of the height of the vehicle while the other is disposed in the forward-backward direction of the vehicle. Therefore, a change of the load, acting on the vehicle, is detected by one of the first and second sensors, and also a change of the load in the forward-backward direction of the vehicle is detected by the other of the first and second sensors, and thus the measurement of the loaded weight and the measurement of the acceleration and deceleration of the vehicle can both be effected simultaneously with the single device.

In the sensing device of the present invention defined in claim 4, when the first portion of the base member is moved relative to the second portion in at least one of the intersecting direction and the second intersecting direction perpendicular to both of the interconnecting direction and the intersecting direction, a shearing force is positively produced at the third portion whose dimension in this direction is smaller than that of the first and second portions, and the output, corresponding to the change of the load in the direction of movement of the first portion relative to the second portion, can be fed from each of the first and second sensors with a good sensitivity.

BEST MODE FOR CARRYING OUT THE INVENTION

A sensing device of an embodiment of the present invention will now be described with reference to the drawings.

Figure 1:
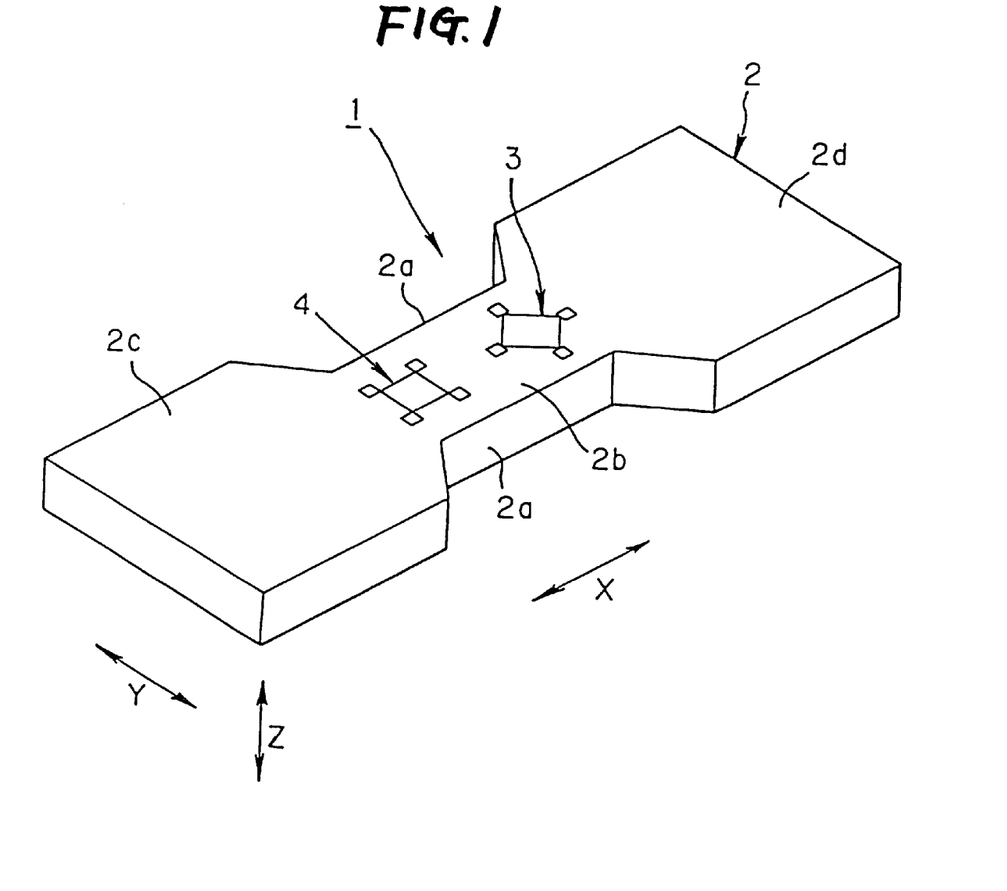
FIG. 1 is a perspective view of a sensing device of one embodiment of the present invention.
Figure 2:
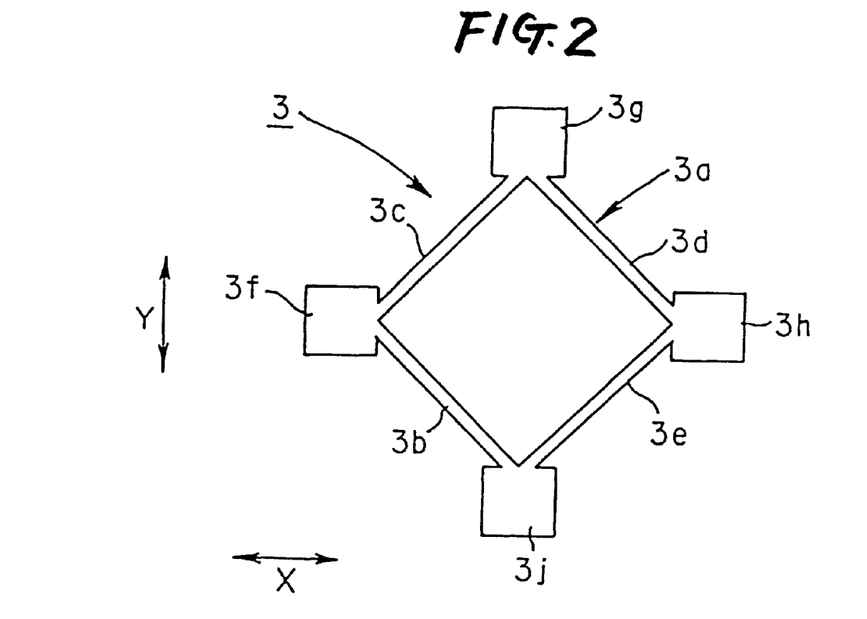
FIG. 2 is an enlarged plan view of a width-direction load sensor shown in FIG. 1.
Figure 3:
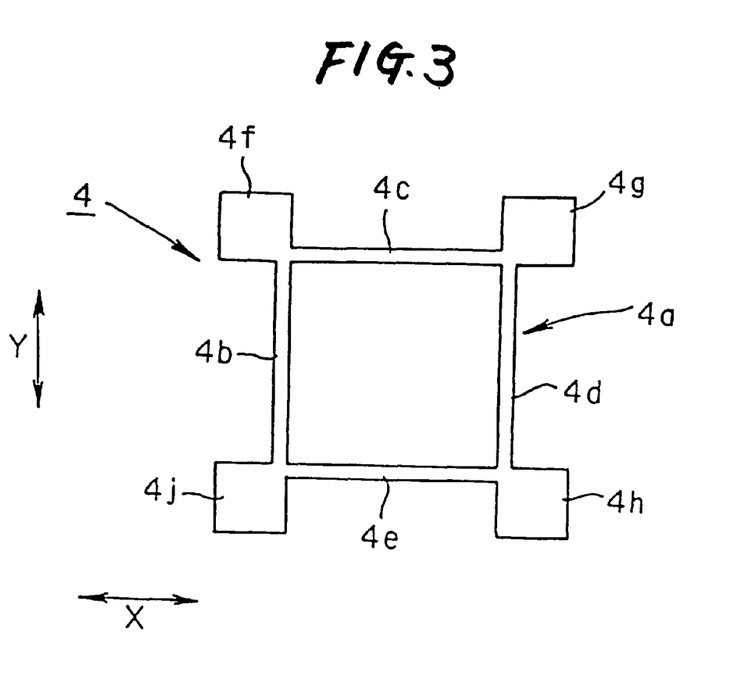
FIG. 3 is an enlarged plan view of a thickness-direction load sensor shown in FIG. 1.
Figure 4:
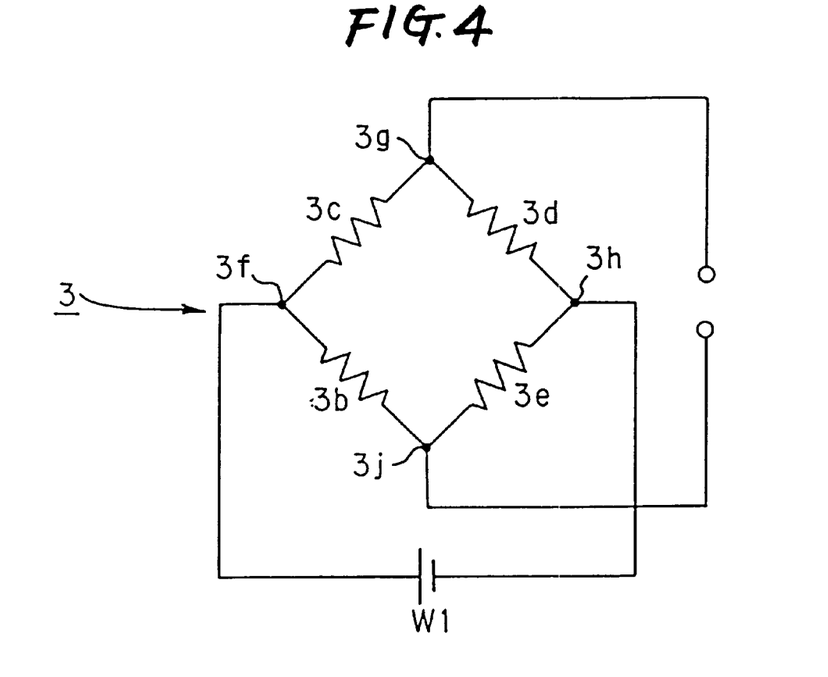
FIG. 4 is an equivalent circuit of the width-direction load sensor of FIG. 2.
Figure 5:
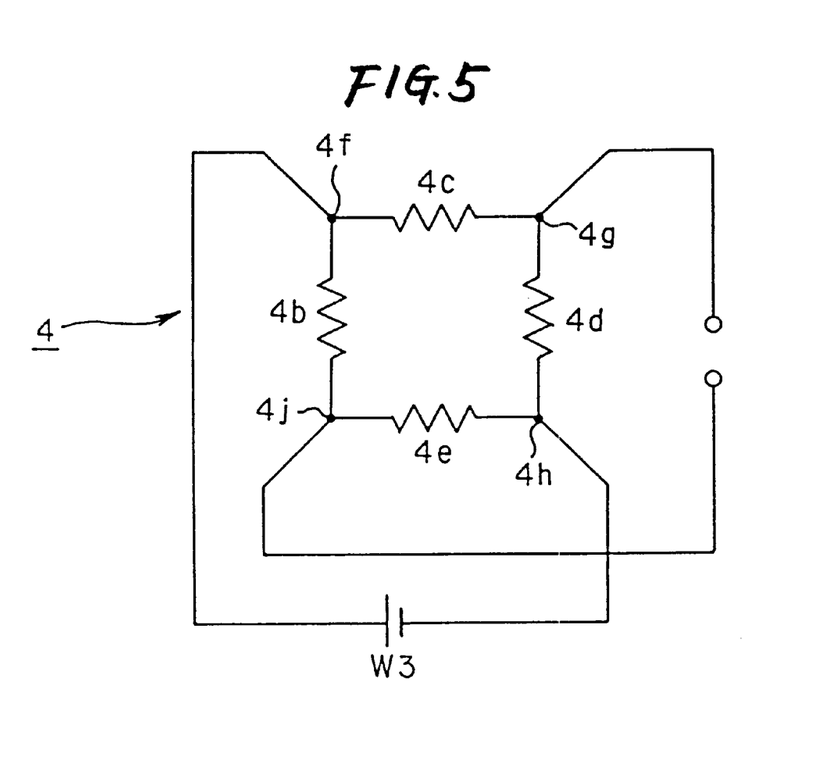
FIG. 5 is an equivalent circuit of the thickness-direction load sensor of FIG. 3.

FIG. 1 is a perspective view of the sensing device of the embodiment of the present invention, FIG. 2 is an enlarged plan view of a width-direction load sensor shown in FIG. 1, FIG. 3 is an enlarged plan view of a thickness-direction load sensor shown in FIG. 1, FIG. 4 is an equivalent circuit of the width-direction load sensor of FIG. 2, and FIG. 5 is an equivalent circuit of the thickness-direction load sensor of FIG. 3.

The sensing device, designated by reference numeral 1 in FIG. 1, comprises a plate-like member 2, and two (width-direction and thickness-direction) load sensors 3 and 4.

The plate-like member 2 (corresponding to a base member) is made of a stainless steel plate coated with an insulating film (which is not shown, and corresponds to an insulating region) such as an oxide of silicon, and has a substantially rectangular, flattened shape as seen in a plan view, and has such a size as to be received within the first case assembly 9 and the second case assembly 11 shown in FIG. 13.

Notches 2a of a substantially trapezoidal shape are formed respectively in opposite edges of the plate-like member 2 spaced from each other in a widthwise direction Y (corresponding to an intersecting direction) perpendicular to a longitudinal direction X (corresponding to an interconnecting direction), the notches 2a being disposed at a substantially central portion of the plate-like member in the longitudinal direction. A sensor portion 2b (corresponding to a third portion) is constituted by that portion of the plate-like member 2 lying between these notches 2a, and two fixing portions 2c and 2d (corresponding respectively to first and second portions) are constituted respectively by those portions of the plate-like member 2 disposed respectively on the opposite sides of the sensor portion 2b in the longitudinal direction X. With this construction, a dimension of the sensor portion 2b in the widthwise direction Y of the plate-like member 2 is smaller than that of the two fixing portions 2c and 2d.

Each of the width-direction and thickness-direction load sensors 3 and 4 is made of, for example, a thin film of polycrystal silicon, and the two load sensors are mounted on one side of the sensor portion 2b of the plate-like member 2, and are spaced from each other in the longitudinal direction X.

As shown in FIG. 2, the width-direction load sensor 3 is constituted by a resistance portion 3a and four terminal portions 3f to 3j.

The resistance portion 3a includes four narrow, elongate resistors 3b to 3e of the same length which are interconnected at their ends to assume a substantially square shape as seen in a plan view. Two of four corners of the resistance portion 3a, disposed on one diagonal line, are spaced from each other in the longitudinal direction X of the plate-like member 2, and the other two corners, lying on the other diagonal line, are spaced from each other in the widthwise direction Y of the plate-like member 2, and the resistors 3b to 3e extend such that they intersect the longitudinal direction X and the widthwise direction Y at an angle of 45°.

The four terminal portions 3f to 3j (corresponding respectively to connecting regions (recited in the claims) each interconnecting the associated resistors) are disposed respectively at the four corners of the resistance portion 3a, that is, at the connecting region at which the two adjacent resistors 3b and 3c are connected together at their ends, the connecting region at which the two resistors 3c and 3d are connected together at their ends, the connecting region at which the two resistors 3d and 3e are connected together at their ends, and the connecting region at which the two resistors 3e and 3b are connected together at their ends, and the four terminal portions are electrically connected respectively to the two resistors 3b and 3c, the two resistors 3c and 3d, the two resistors 3d and 3e, and the two resistors 3e and 3b.

Each of the terminal portions 3f to 3j has a substantially square shape as seen in a plan view, and two opposite sides of each terminal portion, spaced from each other in the longitudinal direction X of the plate-like member 2, extend in the widthwise direction Y of the plate-like member 2, and the other two opposite sides, spaced from each other in the widthwise direction Y, extend in the longitudinal direction X.

The width-direction load sensor 3 of the above construction constitutes a semiconductor resistance bridge in which when a voltage $V_{cc1}$ is applied from an operating power source W1 (shown in FIG. 4) between the terminal portion 3f, disposed at the connecting region interconnecting the resistors 3b and 3c, and the terminal portion 3h which is spaced from the terminal portion 3f in the longitudinal direction X of the plate-like member 2, and is disposed at the connecting region interconnecting the resistors 3d and 3e, a magnitude of a signal $S_{out1}$, outputted from between the terminal portion 3g, disposed at the connecting region interconnecting the resistors 3c and 3d, and the terminal portion 3j which is spaced from the terminal portion 3g in the widthwise direction Y of the plate-like member 2, and is disposed at the connecting region interconnecting the resistors 3e and 3b, varies in accordance with that component of the load (acting on the sensing device 1) disposed in the widthwise direction Y.

In this embodiment, the terminal portions 3f and 3h correspond respectively to the two connecting regions (each interconnecting the associated two resistors) disposed on one diagonal line recited in the claims, and the terminal portions 3g and 3j correspond respectively to the two connecting regions (each interconnecting the associated two resistors) disposed on the other diagonal line recited in the claims.

As shown in FIG. 3, the thickness-direction load sensor 4 is constituted by a resistance portion 4a and four terminal portions 4f to 4j.

The resistance portion 4a includes four narrow, elongate resistors 4b to 4e of the same length which are interconnected at their ends to assume a substantially square shape as seen in a plan view. As shown in FIG. 1, the two opposed resistors 4b and 4d, spaced from each other in the longitudinal direction X of the plate-like member 2, extend in the widthwise direction Y of the plate-like member 2, and the other two opposed resistors 4c and 4e, spaced from each other in the widthwise direction Y of the plate-like member 2, extend in the longitudinal direction X.

The four terminal portions 4f to 4j (corresponding respectively to connecting regions (recited in the claims) each interconnecting the associated resistors) are disposed respectively at four corners of the resistance portion 4a, that is, at the connecting region at which the two adjacent resistors 4b and 4c are connected together at their ends, the connecting region at which the two resistors 4c and 4d are connected together at their ends, the connecting region at which the two resistors 4d and 4e are connected together at their ends, and the connecting region at which the two resistors 4e and 4b are connected together at their ends, and the four terminal portions are electrically connected respectively to the two resistors 4b and 4c, the two resistors 4c and 4d, the two resistors 4d and 4e, and the two resistors 4e and 4b.

Each of the terminal portions 4f to 4j has a substantially square shape as seen in a plan view, and two opposite sides of each terminal portion, spaced from each other in the longitudinal direction X of the plate-like member 2, extend in the widthwise direction Y of the plate-like member 2, and the other two opposite sides, spaced from each other in the widthwise direction Y, extend in the longitudinal direction X.

The thickness-direction load sensor 4 of the above construction constitutes a semiconductor resistance bridge (similar to that of the width-direction load sensor 3) in which when a voltage $V_{cc3}$ is applied from an operating power source W3 (shown in FIG. 5) between the terminal portion 4f, disposed at the connecting region interconnecting the resistors 4b and 4c, and the terminal portion 4h disposed at the connecting region interconnecting the resistors 4d and 4e, a magnitude of a signal $S_{out3}$, outputted from between the terminal portion 4g, disposed at the connecting region interconnecting the resistors 4c and 4d, and the terminal portion 4j disposed at the connecting region interconnecting the resistors 4e and 4b, varies in accordance with that component of the load (acting on the sensing device 1) disposed in a thickness-direction Z (see FIG. 1) perpendicular to the longitudinal direction X and the widthwise direction Y of the plate-like member 2.

In this embodiment, the terminal portions 4f and 4h correspond respectively to the two connecting regions (each interconnecting the associated two resistors) disposed on one diagonal line recited in the claims, and the terminal portions 4g and 4j correspond respectively to the two connecting regions (each interconnecting the associated two resistors) disposed on the other diagonal line recited in the claims.

The sensing device 1 of this construction is received, for example, in each of the first case assembly 9 and the second case assembly 11 as described above for the conventional sensing device 7 of FIG. 13, and in this condition these sensing devices are received respectively in the opposite end portions of the shackle pin 5 in such a posture that the longitudinal direction X of the plate-like member 2 is disposed in the direction of the width of the shackle pin 5 extending in a direction B of a width of a vehicle while the widthwise direction Y of the plate-like member 2 is disposed in a direction A of a height of the vehicle, and one fixing portion 2c is associated with the bracket 33 (corresponding to a first structural portion) while the other fixing portion 2d is associated with the shackle 34 (corresponding to a second structural portion).

Next, the operation of the sensing device of this construction will be described.

When one of the bracket 33 and the shackle 34 is moved relative to the other in the direction A of the height of the vehicle by a load or the like acting on the vehicle, one fixing portion 2c of the plate-like member 2 of the sensing device 1, associated with the bracket 33, moves relative to the other fixing portion 2d, associated with the shackle 34, in the direction A of the height of the vehicle through the shackle pin 5 and the first case assembly 9 or through the shackle pin 5 and the second case assembly 11, and therefore the one fixing portion 2c of the plate-like member 2 moves relative to the other fixing portion 2d in the widthwise direction Y of the plate-like member 2 disposed in the direction A of the height of the vehicle, and a shearing force, acting in this widthwise direction Y, is produced at the sensor portion 2b whose dimension in the widthwise direction Y is smaller than that of the fixing portions 2c and 2d, so that this sensor portion 2b is strained.

As a result, one of the pair of resistors 3b and 3d, disposed on one diagonal line, and the pair of resistors 3c and 3e, disposed on the other diagonal line, are extended the same length from their original dimension, and resistance values R3b and R3d of the corresponding resistors 3b and 3d (or resistance values R3c and R3e of the resistors 3c and 3e) decrease the same value from their original value, and also the other of the pair of resistors 3b and 3d and the pair of resistors 3c and 3e are contracted the same length from their original dimension, and the resistance values R3c and R3e of the corresponding resistors 3c and 3e (or the resistance values R3b and R3d of the resistors 3b and 3d) increase the same value from their original value.

Figure 6:
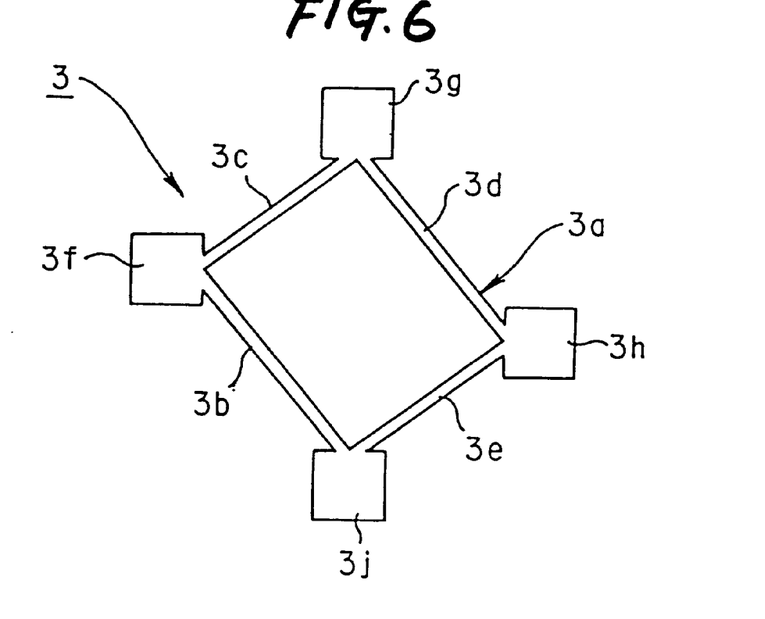
FIG. 6 is a view explanatory of a deformed condition of the width-direction load sensor of FIG. 2 obtained when a load is changed in a direction of a height of a vehicle.

As a result, a potential $$V3g=V_{cc1}\times\{R3c/(R3c+R3d)\},$$

appearing at the terminal portion 3g, and a potential $$V3j=V_{cc1}\times\{R3b/(R3b+R3c)\},$$

appearing at the terminal portion 3j, vary from their respective original values, and if the resistors 3b and 3d are extended the same length while the resistors 3c and 3e are contracted the same length as shown in FIG. 6, the potential V3g, appearing at the terminal portion 3g, decreases from the original value while the potential V3j, appearing at the terminal portion 3j, increases from the original value.

Figure 7:
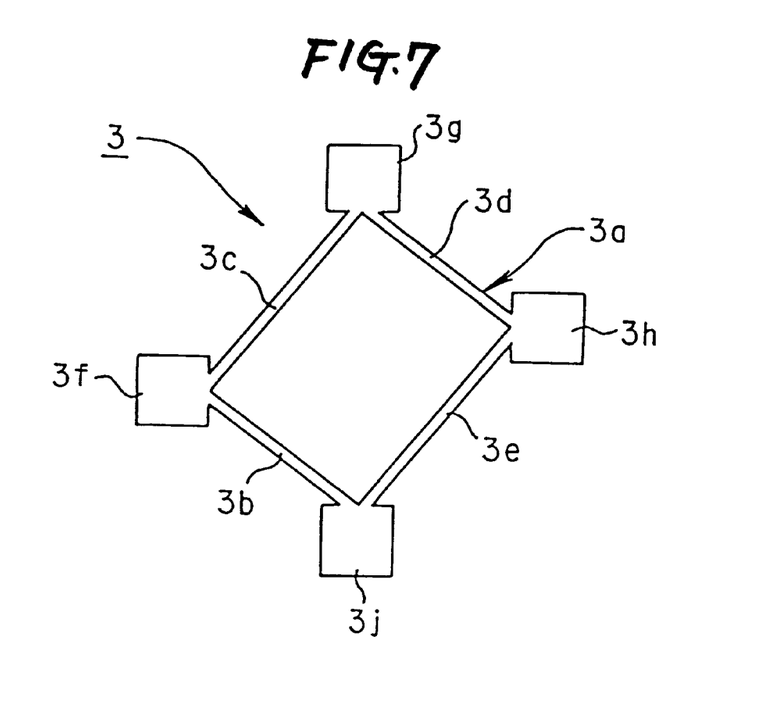
FIG. 7 is a view explanatory of a deformed condition of the width-direction load sensor of FIG. 2 obtained when a load is changed in the direction of the height of the vehicle.

In contrast, if the resistors 3c and 3c are extended the same length while the resistors 3b and 3d are contracted the same length as shown in FIG. 7, the potential V3g, appearing at the terminal portion 3g, increases from the original value while the potential V3j, appearing at the terminal portion 3j, decreases from the original value, and in either case, the potential difference V3g−V3j between the terminal portions 3g and 3j varies from the original value.

Figure 8:
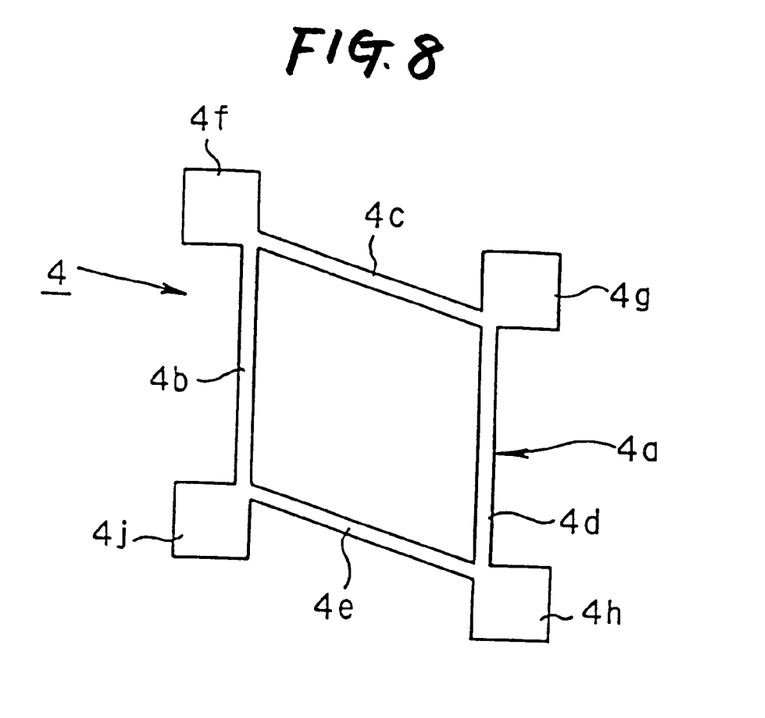
FIG. 8 is a view explanatory of a deformed condition of the thickness-direction load sensor of FIG. 3 obtained when a load is changed in the direction of the height of the vehicle.
Figure 9:
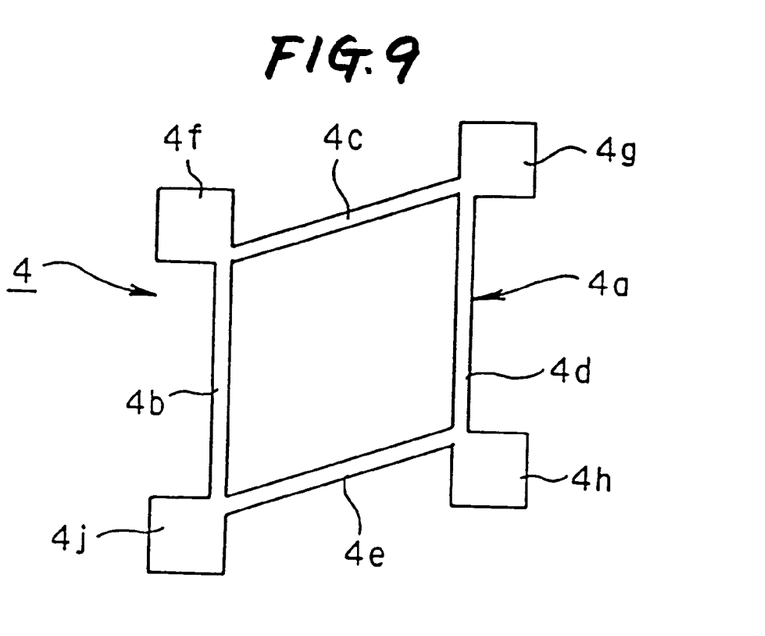
FIG. 9 is a view explanatory of a deformed condition of the thickness-direction load sensor of FIG. 3 obtained when a load is changed in the direction of the height of the vehicle.

On the other hand, in the thickness-direction load sensor 4, when a shearing force, acting in the widthwise direction Y of the plate-like member 2, is produced at the sensor portion 2b, so that this sensor portion 2b is strained, the pair of resistors 4b and 4d, opposed to each other in the longitudinal direction X of the plate-like member 2, and the pair of resistors 4c and 4d, opposed to each other in the widthwise direction Y of the plate-like member 2, are extended the same length from their original length, as shown in FIGS. 8 and 9.

Therefore, resistance values R4b, R4c, R4d and R4e of the resistors 4b, 4c, 4d and 4e decrease the same value from their original value, and therefore a potential $$V4g=V_{cc3}\times\{R4c/(R4c+R4d)\},$$

appearing at the terminal portion 4g, and a potential $$V4j=V_{cc3}\times\{R4b/(R4b+R4e)\},$$

appearing at the terminal portion 4j, will not vary from their respective original values, and therefore the potential difference V4g−V4j between the terminal portions 4g and 4j will not vary from the original value.

Next, when one of the bracket 33 and the shackle 34 is moved relative to the other in a forward-backward direction C (see FIG. 13) of the vehicle by the acceleration and deceleration of the vehicle or the like, one fixing portion 2c of the plate-like member 2 of the sensing device 1, associated with the bracket 33, moves relative to the other fixing portion 2d, associated with the shackle 34, in the forward-backward direction C of the vehicle through the shackle pin 5 and the first case assembly 9 or through the shackle pin 5 and the second case assembly 11, and therefore the one fixing portion 2c of the plate-like member 2 moves relative to the other fixing portion 2d in the direction A of the height of the vehicle and also in the thickness-direction Z (corresponding to a second intersecting direction) perpendicular to the longitudinal direction X and the widthwise direction Y of the plate-like member 2, and a shearing force, acting in this thickness-direction Z, is produced at the sensor portion 2b of the plate-like member 2, so that this sensor portion 2b is strained.

Figure 10:
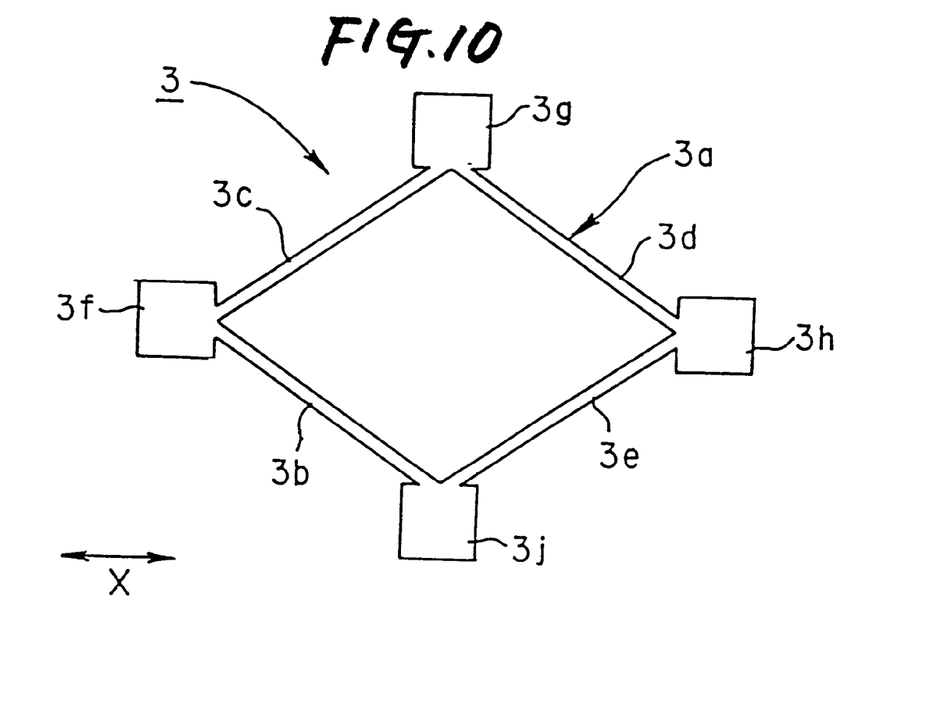
FIG. 10 is a view explanatory of a deformed condition of the width-direction load sensor of FIG. 2 obtained when a load is changed in a forward-backward direction of the vehicle.

As a result, in the width-direction load sensor 3, the pair of resistors 3b and 3d, disposed on one diagonal line, and the pair of resistors 3c and 3e, disposed on the other diagonal line, are extended the same length from their original dimension, as shown in FIG. 10.

Therefore, the resistance values R3b, R3c, R3d and R3e, of the resistors 3b, 3c, 3d and 3e decrease the same value from their original value, and therefore the potential V3g, appearing at the terminal portion 3g, and the potential V3j, appearing at the terminal portion 3j, will not vary from their respective original values, and the potential difference V3g−V3j between the terminal portions 3g and 3j will not vary from the original value.

Figure 11:
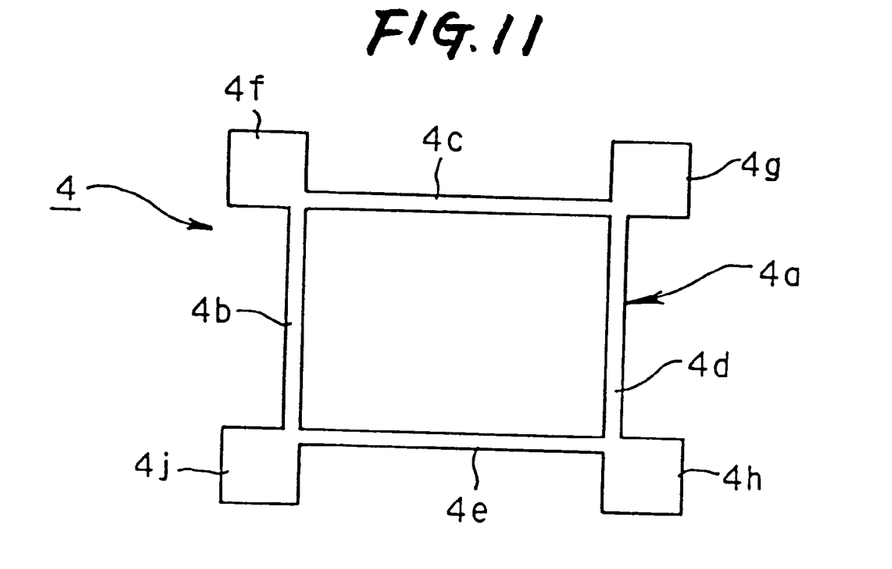
FIG. 11 is a view explanatory of a deformed condition of the thickness-direction load sensor of FIG. 3 obtained when a load is changed in the forward-backward direction of the vehicle.

On the other hand, in the thickness-direction load sensor 4, when the shearing force, acting in the thickness-direction Z of the plate-like member 2, is produced at the sensor portion 2b, so that this sensor portion 2b is strained, the pair of resistors 4b and 4d, opposed to each other in the longitudinal direction X of the plate-like member 2, will not vary from their original dimension, but the pair of resistors 4c and 4e, opposed to each other in the widthwise direction Y of the plate-like member 2, are extended the same length from their original dimension as shown in FIG. 11, and therefore the resistance values R4b and R4d of the resistors 4b and 4d will not vary from the their respective original values, but the resistance values R4c and R4e of the resistors 4c and 4e vary from their respective original values.

Therefore, the potential V4g, appearing at the terminal portion 4g, increases from the original value whereas the potential V4j, appearing at the terminal portion 4j, will not vary from the original value, and therefore the potential difference V4g−V4j between the terminal portions 4g and 4j varies from the original value.

Therefore, when one of the bracket 33 and the shackle 34 is moved relative to the other in the direction A of the height of the vehicle by a load acting on the vehicle or the like, the output of the width-direction load sensor 3 varies from the original value whereas the output of the thickness-direction load sensor 4 will not vary from the original value. On the other hand, when one of the bracket 33 and the shackle 34 is moved relative to the other in the forward-backward direction C of the vehicle by the acceleration and deceleration of the vehicle or the like, the output of the width-direction load sensor 3 will not vary from the original value whereas the output of the thickness-direction load sensor 4 varies from the original value.

As is clear from the foregoing description, in this embodiment, the direction B of the width of the vehicle and the forward-backward direction C of the vehicle correspond to the "perpendicular direction" recited in the claims.

As described above, in this embodiment, the sensing device 1, adapted to be received within the shackle pin 5 interconnecting the bracket 33 and the shackle 34 on which the load of the vehicle acts, is constituted by the fixing portions 2c and 2d, defined respectively by the opposite end portions of the plate-like member 2 whose surface is covered with an insulating film in the longitudinal direction X, and the sensor portion 2b interconnecting the two fixing portions 2c and 2d, and the dimension of the sensor portion 2b in the widthwise direction Y of the plate-like member 2 is smaller than that of each of the fixing portions 2c and 2d, and the bracket 33 and the shackle 34 are connected together by the shackle pin 5, and in this condition one fixing portion 2c is disposed at the side of the bracket 33 while the other fixing portion 2d is disposed at the side of the shackle 34, and the longitudinal direction X of the plate-like member 2 is disposed in the direction of the axis of the shackle pin 5, that is, in the direction B of the width of the vehicle, and the widthwise direction Y of the plate-like member 2 is disposed in the direction A of the height of the vehicle, and the direction Z of the thickness of the plate-like member 2 is disposed in the forward-backward direction C of the vehicle.

In this embodiment, the width-direction and thickness-direction load sensors 3 and 4 are mounted on the sensor portion 2, and are spaced from each other in the longitudinal direction X of the plate-like member 2, and the width-direction load sensor 3 comprises the resistance portion 3a, including the four resistors 3b to 3e which intersect the longitudinal direction X and the widthwise direction Y of the plate-like member 2 at 45°, and are connected together to assume a substantially square shape, and the four terminal portions 3f to 3j disposed respectively at the connecting regions each interconnecting the associated ones of the resistors 3b to 3e, and the thickness-direction load sensor 4 comprises the resistance portion 4a, including the resistors 4b and 4d (opposed to each other in the longitudinal direction X of the plate-like member 2) and the resistors 4c and 4e (opposed to each other in the widthwise direction Y of the plate-like member 2) which are connected together to assume a substantially square shape, and the four terminal portions 4f to 4j disposed respectively at the connecting regions each interconnecting the associated ones of the resistors 4b to 4e, and the voltage $V_{cc1}$, $V_{cc3}$ is applied from the operating power source W1, W3 between the two terminal portions 3f and 3h, 4f and 4h disposed on one diagonal line of each of the width-direction and thickness-direction load sensors 3 and 4.

Therefore, when the bracket 33 and the shackle 34 are moved relative to each other in the direction A of the height of the vehicle by a load acting on the vehicle or the like, the potential difference V3g–V3j between the terminal portions 3g and 3j of the width-direction load sensor 3 varies from the original value, and also the potential difference V4g–V4j between the terminal portions 4g and 4j of the thickness-direction sensor 4 will not vary from the original value. On the other hand, when the bracket 33 and the shackle 34 are moved relative to each other in the forward-backward direction C of the vehicle by the acceleration and deceleration of the vehicle or the like, the potential difference V3g–V3j between the terminal portions 3g and 3j of the width-direction loadsensor 3 will not vary from the original value, and also the potential difference V4g–V4j between the terminal portions 4g and 4j of the thickness-direction sensor 4 varies from the original value.

Therefore, based on the potential difference V3g–V3j (which is the output of the width-direction load sensor 3) between the terminal portions 3g and 3j and the potential difference V4g–V4j (which is the output of the thickness-direction load sensor 4) between the terminal portions 4g and 4j, a change of the load in the direction A of the height of the vehicle, which is necessary for the measurement of the loaded weight of the vehicle, and a change of the load in the forward-backward direction C of the vehicle, which is necessary for the measurement of the acceleration and deceleration of the vehicle, can be both detected simultaneously by the single sensing device 1 without the need for an extra installation space, and this sensing device has the same size as that of the conventional sensing device 7, as shown in FIG. 14, which is capable of detecting only a change of the load in the direction A of the height of the vehicle.

In this embodiment, the dimension of the sensor portion 2b in the widthwise direction Y of the plate-like member 2 may be equal to that of the two fixing portions 2c and 2d, but if the dimension of the sensor portion 2b in the widthwise direction Y of the plate-like member 2 is smaller than that of the two fixing portions 2c and 2d as in this embodiment, the shearing force, acting in the widthwise direction Y of the plate-like member 2 disposed in the direction A of the height of the vehicle, can be easily produced at the sensor portion 2b when the bracket 33 and the shackle 34 are moved relative to each other in the direction A of the height of the vehicle, and as a result a change of the load in the direction A of the height of the vehicle can be detected by the width-direction load sensor 3 with an enhanced sensitivity.

Therefore, in addition to the dimension of the sensor portion in the widthwise direction Y of the plate-like member 2, or instead of this dimension of the sensor portion in the widthwise direction Y of the plate-like member 2, the dimension of the sensor portion 2b in the direction Z of the thickness of the plate-like member 2 may be made smaller than that of the two fixing portions 2c and 2d so that a shearing force, acting in the thickness-direction Z of the plate-like member 2 disposed in the forward-backward direction C of the vehicle, can be easily produced at the sensor portion 2b of the sensing device 1 mounted within the shackle pin 5.

In this embodiment, although the sensor portion 2b is formed by that portion of the plate-like member 2 lying between the notches 2a, the sensor portion 2b may include those portions of the plate-like member 2 extending from the notches 2a respectively toward the opposite ends of the plate-like member 2 in the longitudinal direction X, that is, those portions of the fixing portions 2c and 2d disposed near to the notches 2a of this embodiment, if when the bracket 33 and the shackle 34 move relative to each other with the sensing device 1 mounted within the shackle pin 5, a shearing force is produced in this relative-movement direction.

Further, in this embodiment, in order to detect not only a change of the load in the direction A of the height of the vehicle but also a change of the load in the forward-backward direction C of the vehicle, the sensing device 1 is so arranged that the longitudinal direction X of the plate-like member 2 is disposed in the direction B of the width of the vehicle while the widthwise direction Y of the plate-like member 2 is disposed in the direction A of the height of the vehicle. However, in order to detect a change of the load in the direction A of the height of the vehicle and a change of the load in the direction B of the width of the vehicle, the sensing device 1 may be so arranged that the longitudinal direction X of the plate-like member 2 is disposed in the forward-backward direction C of the vehicle while the widthwise direction Y of the plate-like member 2 is disposed in the direction A of the height of the vehicle.

Similarly, in order that a change of the load in the direction A of the height of the vehicle can be detected by the output of the thickness-direction load sensor 4 and that a change of the load in the forward-backward direction C of the vehicle can be detected by the output of the width-direction load sensor 3, the sensing device 1 may be so arranged that the longitudinal direction X of the plate-like member 2 is disposed in the direction B of the width of the vehicle, and the thickness-direction Z of the plate-like member 2 is disposed in the direction A of the height of the vehicle, and the widthwise direction Y of the plate-like member 2 is disposed in the forward-backward direction C of the vehicle.

In this embodiment, although the width-direction and thickness-direction load sensors 3 and 4 are both mounted on one side of the sensor portion 2b of the plate-like member 2, the width-direction and thickness-direction load sensors 3 and 4 may be separately mounted on the opposite sides of the sensor portion 2b, respectively.

In this embodiment, although the plate-like member 2 is coated with the insulating film made of an oxide of silicon or the like over the entire surface thereof, only the sensor portion 2b, having the width-direction and thickness-direction load sensors 3 and 4, may be coated with this insulating film.

This embodiment has been described, taking the construction as an example, in which the sensing device is mounted in the shackle pin 5, interconnecting the bracket 33 and the shackle 34 of the vehicle so as to detect change of the load acting on the vehicle. However, the present invention can be applied to a wide variety of sensing elements of the type which is mounted on a load-acting region so as to detect changes of a load in two directions.

INDUSTRIAL APPLICABILITY

As described above, the sensing device of the present invention, defined in claim 1, is the sensing device for being strained by a load from the exterior and for outputting a signal corresponding to a level of this strain, the sensing device comprising the base member including the first and second portions, and the third portion interconnecting the first and second portions, the third portion being strained upon movement of the second portion relative to the first portion, so that a shearing force, acting in a direction of the relative movement, is produced at the third portion; the insulating region formed on at least part of the surface of the third portion; and the first and second sensors formed on the insulating region; wherein each of the first and second sensors comprises four resistors of an electrically-conductive material connected together to form a bridge, and when a voltage is applied between two of four connecting regions, each interconnecting the associated resistors, which are disposed on one diagonal line, a potential difference, developing between the other two connecting regions disposed on the other diagonal line, varies in accordance with the shearing force produced at the third portion; wherein the first sensor is arranged on the insulating region in such a manner that a line, connecting the two connecting regions on the one diagonal line together, extends in the interconnecting direction of interconnection of the first and second portions by the third portion; and wherein the second sensor is arranged on the insulating region in such a manner that two of the four resistors are opposed to each other, and are spaced from each other in the interconnecting direction while the other two resistors are opposed to each other, and are spaced from each other in the intersecting direction perpendicular to the interconnecting direction.

Therefore, when the first portion of the base member is moved relative to the second portion, so that the third portion is strained, a shearing force, acting in a direction of this relative movement, is produced at the third portion. In this case, if the direction of movement of the first portion relative to the second portion is in the intersecting direction, the opposed two resistors out of the four resistors of the first sensor are extended, and if the direction of movement of the first portion relative to the second portion is perpendicular to both of the intersecting direction and the interconnecting direction, the two resistors (opposed to each other in the interconnecting direction) out of the four resistors of the second sensor are extended. In either case, the output of one of the first and second sensors is varied.

Therefore, when the change of the load occurs in the intersecting direction with respect to the base member and when the change of the load occurs in the direction perpendicular to both of the intersecting direction and the interconnecting direction, these changes of the load in the two directions can be detected simultaneously with the single device.

In the sensing device of the present invention defined in claim 2, the base member is mounted between the first and second structural portions which are moved relative to each other in the direction of the height of the vehicle by a load acting on the vehicle, and are movable relative to each other in the vehicle-perpendicular direction perpendicular to the direction of the height of the vehicle, and one of the first and second portions is structurally connected to one of the first and second structural portions while the other of the first and second portions is structurally connected to the other of the first and second structural portions, and the intersecting direction is disposed in the direction of the height of the vehicle.

Therefore, when one of the first and second structural portions of the vehicle is moved relative to the other in the direction of the height of the vehicle by the load acting on the vehicle, the first portion of the base member is moved relative to the second portion in one of the two directions, that is, the intersecting direction, disposed perpendicular to the interconnecting direction, and the direction perpendicular to both of the interconnecting direction and the intersecting direction. Therefore, with respect to the load acting on the vehicle, a change of the load in the direction of the height of the vehicle can be detected by a change of the output of one of the first and second sensors.

Apart from this, when one of the first and second structural portions is moved relative to the other in the vehicle-perpendicular direction because of the load, acting on the vehicle, or a change of the running condition of the vehicle, the first portion of the base member is moved relative to the second portion in the other of the two directions, that is, the intersecting direction and the direction perpendicular to both of the interconnecting direction and the intersecting direction. Therefore, with respect to the load acting on the vehicle, a change of the load in the forward-backward direction, disposed perpendicular to the direction of the height of the vehicle, or the direction of the width of the vehicle, can be simultaneously detected by a change of the output of the other of the first and second sensors.

In the sensing device of the present invention defined in claim 3, the interconnecting direction is disposed in the direction of the width of the vehicle, and in this case, one of the intersecting direction and the direction perpendicular to both of the interconnecting direction and the intersecting direction is disposed in the direction of the height of the vehicle while the other is disposed in the forward-backward direction of the vehicle. Therefore, a change of the load, acting on the vehicle, is detected by one of the first and second sensors, and also a change of the load in the forward-backward direction of the vehicle is detected by the other of the first and second sensors, and thus the measurement of the loaded weight and the measurement of the acceleration and deceleration of the vehicle can both be effected simultaneously with the single device.

In the sensing device of the present invention defined in claim 4, the dimension of the third portion in one of the intersecting direction and the second intersecting direction perpendicular to both of the interconnecting direction and the intersecting direction is smaller than that of each of the first and second portions.

Therefore, when the first portion of the base member is moved relative to the second portion in at least one of the intersecting direction and the second intersecting direction perpendicular to both of the interconnecting direction and the intersecting direction, a shearing force is positively produced at the third portion whose dimension in this direction is smaller than that of the first and second portions, and the output, corresponding to the change of the load in the direction of movement of the first portion relative to the second portion, can be fed from each of the first and second sensors with a good sensitivity.

What is claimed is:

1. A sensing device for sensing a load and for outputting a signal corresponding to said load, comprising:

a base member including first and second portions, and a third portion interconnecting the first and second portions, the third portion being strained upon movement of the second portion relative to the first portion, so that a shearing force, acting in a direction of the relative movement, is produced at the third portion;

an insulating region formed on at least part of a surface of a third portion; and first and second sensors formed respectively on the insulating region;

wherein said first, second and third portions extend in an interconnecting direction;

wherein each of the first and second sensors includes four resistors of an electrically-conductive material connected together at four connecting regions to form a bridge having a rectangular configuration, and when a voltage is applied between two of the four connecting regions, each interconnecting the associated resistors, which are disposed on one diagonal line, a potential difference, developing between the other two connecting regions disposed on the other diagonal line, varies in accordance with the shearing force produced at the third portion;

wherein the first sensor is arranged on the insulating region in such a manner that a line, connecting the two connecting regions on the one diagonal line together, extends in said interconnecting direction; and wherein the second sensor is arranged on the insulating region in such a manner that two of the four resistors are opposed to each other, and are spaced from each other in the interconnecting direction while the other two resistors are opposed to each other, and are spaced from each other in an intersecting direction perpendicular to the interconnecting direction.

2. The sensing device according to claim 1, wherein the base member is mounted between first and second structural members of a vehicle which are moved relative to each other in a direction of a height of the vehicle by a load acting on the vehicle, and are movable relative to each other in a vehicle-perpendicular direction perpendicular to the direction of the height of the vehicle, and one of the first and second portions is structurally connected to one of the first and second structural members while the other of the first and second portions is structurally connected to the other of the first and second structural members, and the intersecting direction is disposed in the direction of the height of the vehicle.

3. The sensing device according to claim 2, wherein the interconnecting direction is disposed in a direction of a width of the vehicle.

4. The sensing device according to any one of claims 1, 2 or 3, wherein a dimension of the third portion in one of the intersecting direction and a second intersecting direction perpendicular to both of the interconnecting direction and the intersecting direction is smaller than that of each of the first and second portions.

* * * * *